United States Patent
Swierczynski et al.

(10) Patent No.: US 9,750,059 B2
(45) Date of Patent: Aug. 29, 2017

(54) METHODS AND SYSTEMS FOR JOINING A SUB-TALKGROUP OF A FIRST TALKGROUP

(71) Applicant: MOTOROLA SOLUTIONS, INC, Schaumburg, IL (US)

(72) Inventors: Jaroslaw Swierczynski, Cracow (PL); Bartosz Michal Kwiecinski, Malopolskie (PL); Radoslaw Sztando, Cracow (PL); Mariusz R. Wawrowski, Wawrzenczyce (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/936,938

(22) Filed: Nov. 10, 2015

(65) Prior Publication Data
US 2016/0135229 A1 May 12, 2016

(30) Foreign Application Priority Data
Nov. 10, 2014 (EP) .................................... 14460087

(51) Int. Cl.
*H04B 7/00* (2006.01)
*H04W 76/00* (2009.01)
(Continued)

(52) U.S. Cl.
CPC ........ *H04W 76/005* (2013.01); *G06F 21/335* (2013.01); *G06F 21/43* (2013.01);
(Continued)

(58) Field of Classification Search
CPC ..... H04W 76/005; H04W 4/008; H04W 4/08; H04W 84/18
(Continued)

(56) References Cited

U.S. PATENT DOCUMENTS

| 6,697,649 B1 | 2/2004 | Bennett et al. |
| 7,359,724 B2 | 4/2008 | Torvinen |

(Continued)

FOREIGN PATENT DOCUMENTS

| AU | 2001282272 | 2/2007 |
| EP | 2141856 | 1/2010 |

(Continued)

OTHER PUBLICATIONS

Etsa, "Terrestrial Trunked Radio (TETRA); Direct Mode Operation (DMO); Part 6: Security," brochure (2004-2005) pp. 1-42, ETSI EN 300 396-6 V1.2.1.

(Continued)

*Primary Examiner* — Md Talukder
(74) *Attorney, Agent, or Firm* — Daniel R. Bestor

(57) ABSTRACT

A process carried out by a first mobile radio for joining a sub-talkgroup of a first talkgroup includes receiving, via a provisioning process or via an infrastructure wireless communication interface from an infrastructure radio access network (RAN) while within wireless communication range of the RAN, a talkgroup-specific security token associated with and shared by all group mobile radios in a first talkgroup to which the first mobile radio is subscribed via the RAN. The first mobile radio then detects, via a short-range wireless communication interface, a second mobile radio, and authenticates, the second mobile radio using the talkgroup-specific security token. If the authentication is successful, the first mobile radio adds an identity of the second mobile radio to a sub-talkgroup set of mobile radios of the first talkgroup.

20 Claims, 4 Drawing Sheets

(51) Int. Cl.
   *H04L 29/06* (2006.01)
   *H04W 12/04* (2009.01)
   *H04W 12/06* (2009.01)
   *H04W 4/00* (2009.01)
   *H04W 4/08* (2009.01)
   *G06F 21/33* (2013.01)
   *G06F 21/43* (2013.01)
   *H04W 84/18* (2009.01)

(52) U.S. Cl.
   CPC ........ *H04L 63/061* (2013.01); *H04L 63/0807* (2013.01); *H04W 4/008* (2013.01); *H04W 4/08* (2013.01); *H04W 12/04* (2013.01); *H04W 12/06* (2013.01); *G06F 2221/2103* (2013.01); *H04W 84/18* (2013.01)

(58) Field of Classification Search
   USPC .............................. 455/41.1, 41.2, 41.3, 519
   See application file for complete search history.

(56) References Cited

U.S. PATENT DOCUMENTS

| | | | |
|---|---|---|---|
| 7,668,149 | B2 | 2/2010 | Zhao et al. |
| 8,019,383 | B2 | 9/2011 | Kossi et al. |
| 8,103,298 | B2 | 1/2012 | Ong et al. |
| 8,522,019 | B2 | 8/2013 | Michaelis |
| 2003/0186716 | A1 | 10/2003 | Dorenbosch et al. |
| 2004/0203978 | A1 | 10/2004 | Wong et al. |
| 2005/0190740 | A1* | 9/2005 | Zhao ..................... H04W 4/10 370/349 |
| 2007/0078543 | A1* | 4/2007 | Wakefield ......... H04M 1/72522 700/94 |
| 2007/0263560 | A1 | 11/2007 | Saarisalo et al. |
| 2008/0194201 | A1* | 8/2008 | Sinivaara .......... H04W 52/0216 455/41.2 |
| 2010/0167711 | A1 | 7/2010 | Alameh et al. |
| 2010/0302945 | A1* | 12/2010 | Leppanen ........... H04W 40/246 370/235 |
| 2011/0263201 | A1* | 10/2011 | Bukurak ................ H04W 4/00 455/41.2 |
| 2012/0170743 | A1* | 7/2012 | Senese .................. H04L 63/061 380/259 |
| 2012/0230308 | A1 | 9/2012 | Saito et al. |
| 2013/0039324 | A1 | 2/2013 | Kwon et al. |
| 2013/0201279 | A1* | 8/2013 | Civanlar ................ H04N 7/152 348/14.09 |
| 2014/0057645 | A1 | 2/2014 | Chowdhary et al. |
| 2014/0233716 | A1* | 8/2014 | Villette ................ H04M 3/568 379/202.01 |
| 2016/0135229 | A1* | 5/2016 | Swierczynski ....... H04W 4/008 455/519 |
| 2016/0135230 | A1* | 5/2016 | Swierczynski ......... H04W 4/10 455/518 |

FOREIGN PATENT DOCUMENTS

| | | |
|---|---|---|
| EP | 2465252 | 6/2012 |
| EP | 1860819 | 9/2013 |
| EP | 2301193 | 9/2013 |
| WO | 2011019583 | 2/2011 |

OTHER PUBLICATIONS

Meng et al., "Research on AD Hoc networking Based on TETRA DMO," specification (2011) pp. 808-811.
EP144600871 Extended European Search Report dated Mar. 5, 2015 (7 pages).

* cited by examiner

METHODS AND SYSTEMS FOR JOINING A SUB-TALKGROUP OF A FIRST TALKGROUP

This application is a US National Filing and is filed within one year of, and claims priority to under 35 U.S.C. §119, European Patent Application No. EP 14460087.1, filed in the European Patent Office on Nov. 10, 2014, the entire contents of which are incorporated herein by reference.

BACKGROUND OF THE INVENTION

People and organizations communicate wirelessly and on the go. Among the devices that make this possible are devices that are sometimes referred to as subscriber devices, mobile stations, or mobile radios. Examples of mobile radios include cell phones, smart phones, walkie-talkies, and portable hotspots, among others. A mobile radio could be handheld (as may be the case for a walkie-talkie), body-mounted, or attached to a vehicle (such as the roof of a car), as some examples.

Some users of mobile radios have specific requirements. For example, public-safety users may need push-to-talk (PTT) functionality, an officer-down alert, or direct mobile-to-mobile communication (for situations when, e.g., the mobile radios are out of range of a wireless infrastructure), among numerous other examples that could be listed here.

One feature often needed by public-safety users is group calling, which allows for communication among multiple mobile radios. Accordingly, there is a need for methods and systems for improved group calling amongst mobile radios.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
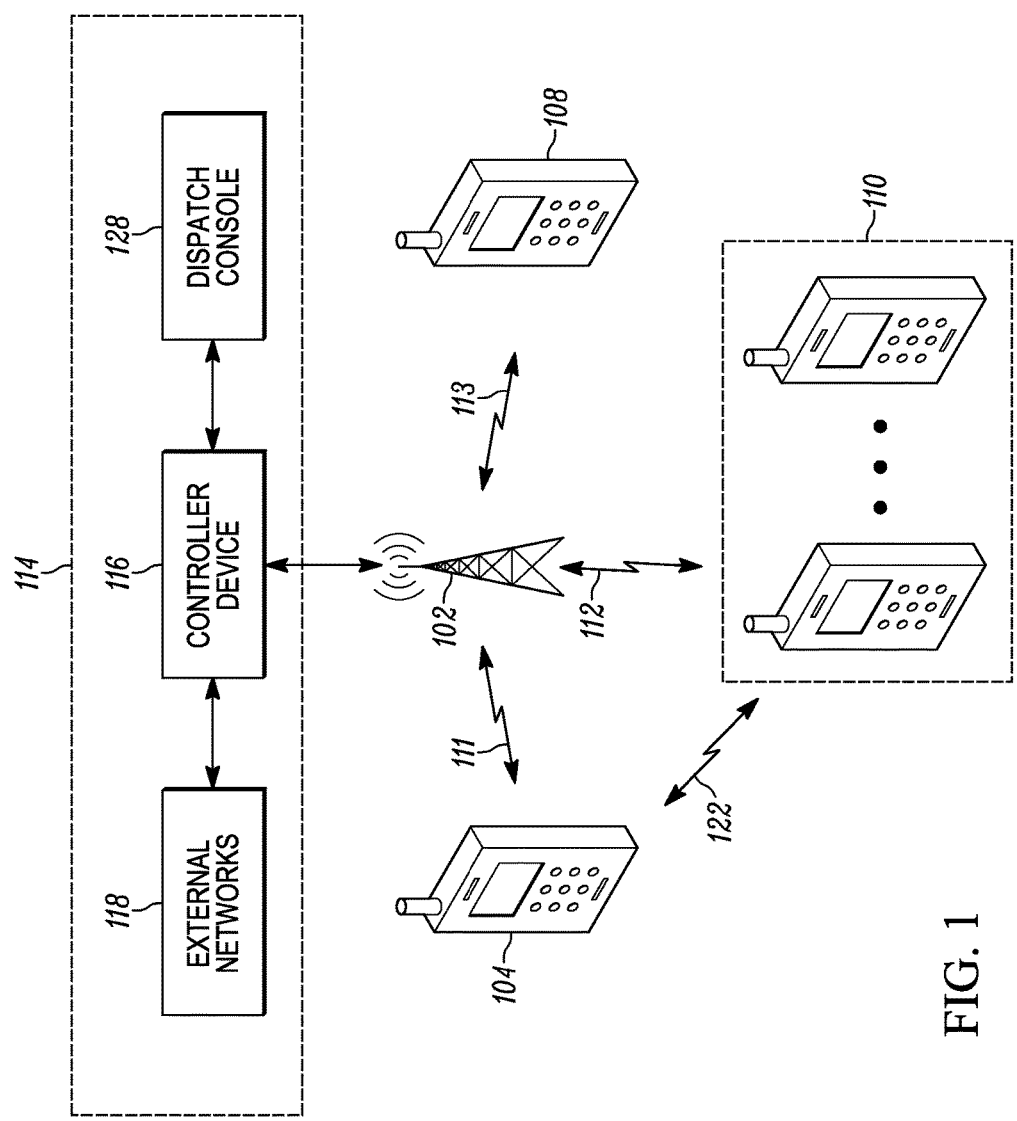
FIG. 1 depicts a communication system, in accordance with at least one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are improved methods and systems for group calling amongst mobile radios (MRs). At least one embodiment takes the form of a first mobile radio that is a member of a first talkgroup, the first mobile radio comprising: an infrastructure wireless communication interface for communicating with an infrastructure radio access network (RAN); a short-range wireless communication interface for communicating with an ad-hoc network; a processor; and data storage containing instructions executable by the processor for causing the first mobile radio to carry out a set of functions, the set of functions comprising: receiving, via a provisioning process or via the infrastructure wireless communication interface from the RAN while within wireless communication range of the RAN, a talkgroup-specific security token associated with and shared by all group mobile radios in a first talkgroup to which the first mobile radio is subscribed via the RAN; detecting, via the short-range wireless communication interface, a second mobile radio; authenticating the second mobile radio using the talkgroup-specific security token and, if successful, adding an identity of the second mobile radio to a sub-talkgroup set of mobile radios of the first talkgroup.

Another embodiment takes the form of a method carried out by a first mobile radio for joining a sub-talkgroup of a first talkgroup, the method comprising: receiving, via a provisioning process or via an infrastructure wireless communication interface from an infrastructure radio access network (RAN) while within wireless communication range of the RAN, a talkgroup-specific security token associated with and shared by all group mobile radios in a first talkgroup to which the first mobile radio is subscribed via the RAN; detecting, via a short-range wireless communication interface, a second mobile radio; and authenticating, by the first mobile radio, the second mobile radio using the talkgroup-specific security token and, if successful, adding an identity of the second mobile radio to a sub-talkgroup set of mobile radios of the first talkgroup.

Before proceeding with this detailed description, it is noted that the entities, connections, arrangements, and the like that are depicted in—and described in connection with—the above-mentioned various figures are presented by way of example only and not by way of limitation. As such, any and all statements or other indications as to what a particular figure depicts, what a particular element or entity in a particular figure represents or encompasses, and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in the following detailed description.

1. Example Network and Device Structures

FIG. 1 depicts a communication system, in accordance with at least one embodiment. As shown, a communication system 100 includes base station (BS) 102, MRs 104, 108, 110, and an infrastructure radio access network (RAN) 114.

MRs 104-110 could be any MR configured to perform the mobile-radio functions described herein. MRs 104 and 108 are illustrated as individual radios, and MRs 110 are illustrated as a group of one or more related MRs, such as MRs already associated with or subscribed to a same talkgroup or sub-talkgroup. In addition to the examples described above, one or all MRs could take the form of mobile phones, smart phones, tablet computers, and/or any combination of these, among numerous other possibilities. In addition to providing wireless-communication capabilities, one or all of MRs 104-110 may include a respective user interface (including elements such as a touch screen, keyboard, microphone, speakers, push-to-talk (PTT) key, and the like) with which a user may interact with the respective MR. An example structure of a MR 104 is described in more detail below in connection with FIG. 2.

In general, the infrastructure RAN 114 and BS 102, working in tandem, provide infrastructure wireless communications services to served MRs that are within a wireless transmission range of the BS 102. While infrastructure RAN 114 is illustrated as including a controller device 116, external networks 118, and a dispatch console 120, in other embodiments, RAN infrastructures may contain a subset of such components or may contain a superset of such components. For example, infrastructure RAN 114 may include one or more elements such as additional base stations, base station controllers, routers, switches, gateways, and the like, arranged, connected, and programmed to provide wireless service to, e.g., MRs 104-110 in a manner that in general is known to those of skill in the relevant art. The communication system 100 could take the form of a public-safety radio network or commercial broadband network. And certainly numerous other possible implementation examples could be listed here.

Controller device 116 may be, for example, a radio controller, call controller, PTT server, zone controller, mobile management entity (MME), base station controller (BSC), mobile switching center (MSC), site controller, Push-to-Talk controller, or other network device. While the controller device 116 is illustrated as a separate entity in the system 100, in other embodiments, the controller device 116 may be integrated with other devices (such as a zone controller) in the infrastructure RAN 114 and/or within BS 102. The controller device 116 may be configured to provide registration, authentication, encryption, routing, and/or other services to MRs 104-110 operating within BS 102's coverage area, in addition to further features and functions disclosed herein with respect to FIGS. 3 and 4. The controller device 116 may additionally track or have access to group subscription information that, for each group identifier associated with a particular group of radios (e.g., talkgroup), identifies MRs (e.g., by hardware ID, hardware MAC address, IP address, radio ID, International Mobile Subscriber Identity (IMSI), a serial number, or some other unique identifier that can be used to identify subscribed member MRs) that are members of the particular group of MRs. The controller device 116 may also generate and/or store sub-group security tokens associated with each talkgroup, for use in forming ad-hoc sub-talkgroups of each talkgroup, as set forth in more detail below. While the term "talkgroup" is used in this disclosure, it will be understood by those of skill in the art that a term such as "communication group" could be used instead, and that the media data being exchanged among the members of the group could be any suitable type of data, such as voice data, image data, video data, and the like. Further, the term "talkgroup" is used in this disclosure to refer to groups of MRs created and/or maintained in a first network, such as the infrastructure RAN 114, while "sub-talkgroup" is used to refer to a sub-group of MRs (relative to a corresponding talkgroup) formed in a second network, such as an ad-hoc manner between MRs without an intervening infrastructure.

External networks 118 may be made accessible to MRs 104-110 via infrastructure RAN 114. External networks 118 may include, for example, a public switched telephone network (PSTN), a plain old telephone (POT) system, a wide-area packet-switched network such as the Internet, or another wired or wireless service provider's network, among other possibilities.

Dispatch console 120 may be directly coupled to controller device 116, as shown, or may be indirectly coupled to controller device 116 via one or more internal or externals networks. The dispatch console 120 allows an administrator or dispatcher at a dispatch console to initiate infrastructure-sourced group communications to groups of MRs, among other features and functions.

Infrastructure RAN 114 and BS 102 may implement one or more radio access technologies (RATs) and may communicate with MRs 104-110 over air-interface links 111-113 (respectively) according to the one or more RATs. Example RATs include infrastructure-mode land-mobile-radio (LMR) such as APCO P25, DMR, PCR, TETRA, and broadband radio such as LTE, among numerous other possibilities. While FIG. 1 illustrates an example in which all MRs 104-110 use a same RAT, in other embodiments, each MR or set of MRs 104-110 may use different RATs to communicate with one or more same or different infrastructure RAN.

Downlink communications over air-interfaces 111-113 may be addressed to multiple MRs (e.g., multicast or broadcast using an identifier, such as a Subscriber Group ID (SGID), that is associated with a group of MRs), and/or to one or more single MRs (e.g., unicast using an identifier, such as a Subscriber Unit Identifier (SUID), that is uniquely associated with that MR), among other possibilities that are known to those of skill in the art.

In addition to infrastructure wireless air-interface links 111-113 communicatively coupling MRs 104-110 to the infrastructure RAN 114, MRs may also maintain ad-hoc or direct-mode ("ad-hoc") air-interface links without any intervening infrastructure between them. For example, air-interface link 122 may wirelessly couple MR 104 to one or more MRs 110. MRs 104, 110 may communicative over air-interface link 112 in accordance with one or more direct-mode air-interface protocols, such as Bluetooth, near field communication (NFC), Infrared Data Association (IrDA), ZigBee, direct-mode land-mobile-radio (LMR), and/or Wi-Fi, as long as the devices are within mutual transmission range of one another. In the example set forth in FIG. 1, MRs 104, 110 are within direct-mode wireless transmission range of one another, while MR 108 is not within wireless transmission range of any one of MRs 104, 110.

Figure 2:
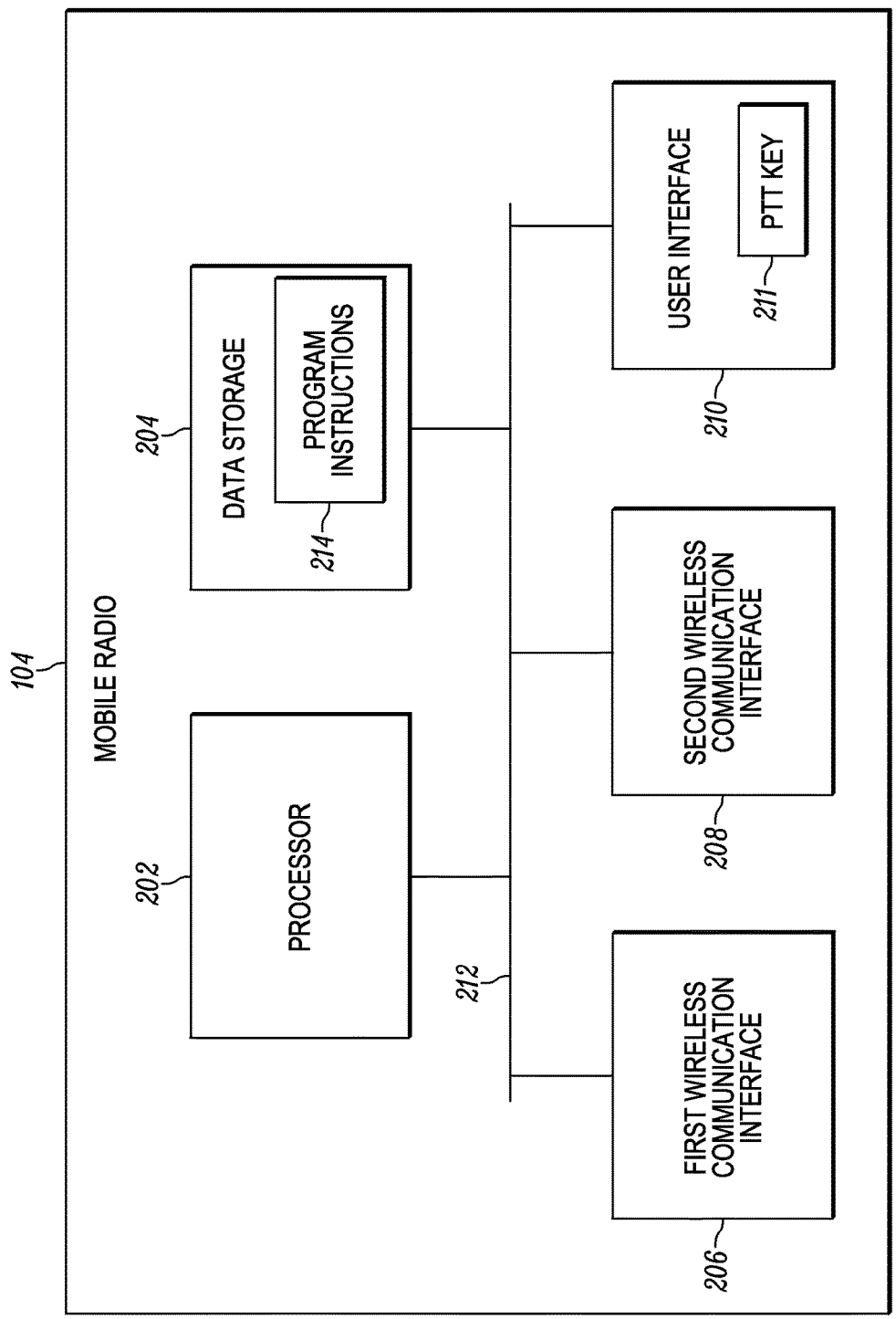
FIG. 2 depicts a block diagram of a mobile radio (MR) that is a member of a talkgroup of MRs and/or a sub-talkgroup of MRs, in accordance with at least one embodiment.

FIG. 2 depicts a MR 104, in accordance with at least one embodiment. As shown, MR 104 includes a processor 202, data storage 204 containing program instructions 214, a first wireless communication interface 206 (which may be an infrastructure wireless communication interface to an infrastructure RAN), a second wireless communication interface 208 (which may be same or similar to the first wireless communication interface or may be a short-range wireless communication interface to an ad-hoc network), and a user interface 210, each of which are interconnected via a system bus 212. The user interface may 210 includes a push-to-talk (PTT) key 211 that functions to activate a transmit function in a half or full-duplex MR, transitioning the MR (when activated) from a listen-only mode to a transmit-only mode (for half-duplex MRs) or transmit and receive mode (for full-duplex MRs). The PTT key 211 may be a hard mechanical switch set under spring pressure and operated by a finger or hand pressure of a user, or may be a contact switch that is operated by a presence of a grounding element such as a user's finger or hand over or on a surface of the contact switch. In other embodiments, the PTT key 211 may be a soft-switch that is programmed to act as a PTT key at all times or only during certain situations, and may take the form of a geometric shape on a touch-sensitive screen labeled with its function or some other input key or button. Other possibilities exist as well.

Those having skill in the relevant art will appreciate that MR 104 could have additional and/or different components, and perhaps a different arrangement of components, among many other possible variations that could be listed here. MRs 108-110 could take a form equivalent or similar to the example MR 104 that is depicted in FIG. 2.

Processor 202 may include one or more processors of any type deemed suitable by those of skill in the relevant art, some examples including a microprocessor and a dedicated digital signal processor (DSP).

Data storage 204 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 2, data storage 204 contains program instructions 214 executable by processor 202 for carrying out various functions including but not limited to those functions, transmissions, and receptions set forth in FIGS. 3-4, though data storage 204 may also contain different and/or additional data (such as operational data).

First wireless communication interface 206 may include one or more infrastructure wireless communication interfaces for communicating with an infrastructure RAN according to one or more of the wireless RATs mentioned above, and/or one or more other infrastructure types and/or protocols deemed suitable by those having skill in the relevant art for a given implementation or in a given context. As such, first wireless communication interface 206 may include any necessary hardware (e.g., chipsets, antennas, etc.), any necessary firmware, and any necessary software for conducting one or more forms of communication with one or more infrastructure RANs.

Second wireless communication interface 208 may have a same or similar structure as first wireless communication interface 206, but may be configured to operate in accordance with a different protocol and/or different RAN. In some embodiments, second wireless communication interface 208 may be a short-range wireless communication interface and support one or more ad-hoc wireless-communication protocols for communicating according to one or more of the ad-hoc or direct-mode protocols mentioned above, and/or one or more other ad-hoc or direct-mode types and/or protocols deemed suitable by those having skill in the relevant art for a given implementation or in a given context. As such, second wireless communication interface 208 may include any necessary hardware (e.g., chipsets, antennas, etc.), any necessary firmware, and any necessary software for conducting one or more forms of communication with one or more infrastructure RANs and/or directly with one or more other MRs in an ad-hoc network.

2. Processes for Joining a Local Sub-Talkgroup of a First Talkgroup

Figure 3:
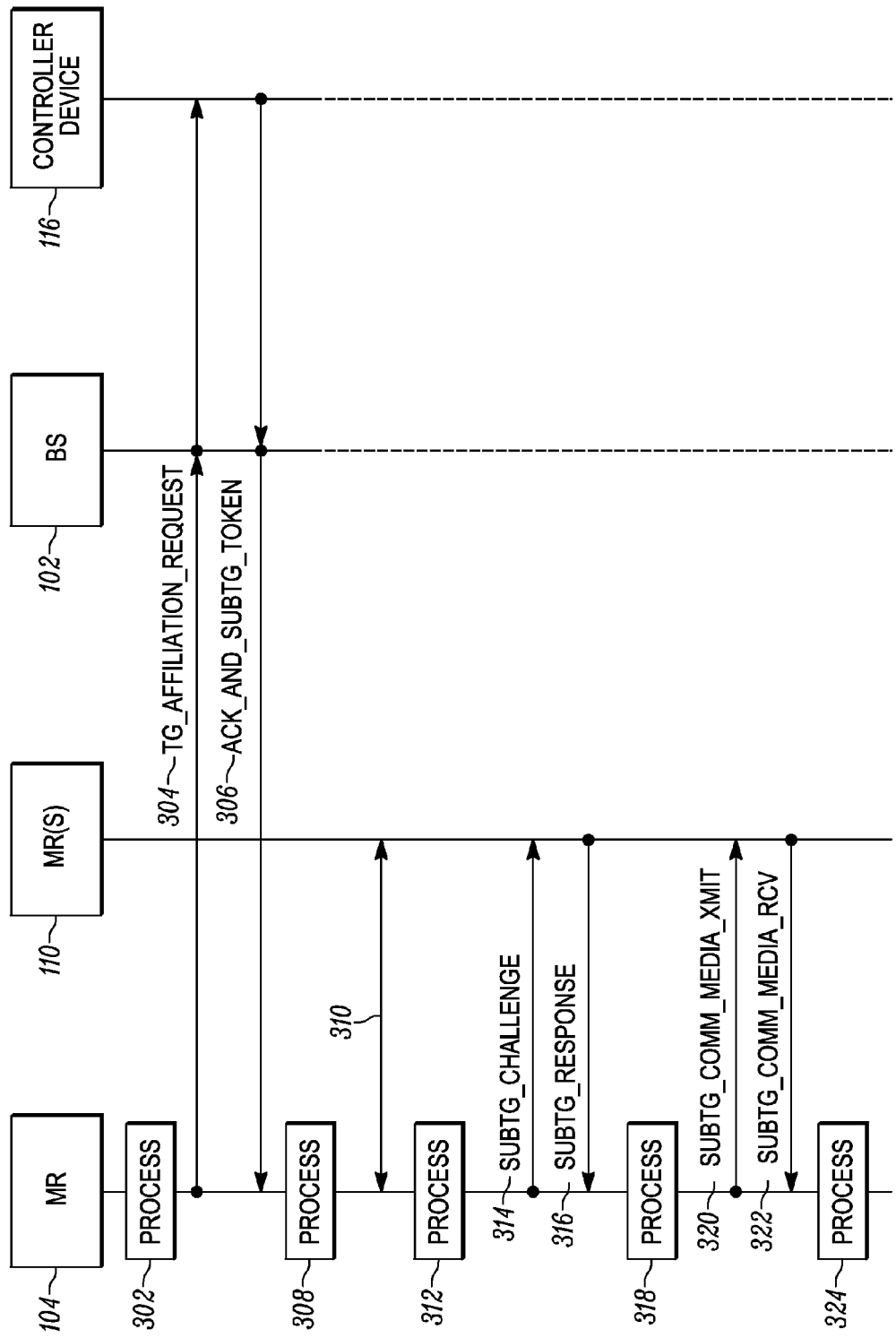
FIG. 3 depicts a ladder diagram illustrating processing steps and message transmissions and receptions for joining a sub-talkgroup of MRs via a short-range wireless communication interface relative to a talkgroup of MRs subscribed via an infrastructure wireless communication interface, in accordance with at least one embodiment.

FIG. 3 depicts a ladder diagram 300 illustrating processing steps, message transmissions, and message receptions in a communication system, including MR 104, MRs 110, BS 102, and controller device 116 of FIG. 1, for joining a local sub-talkgroup of a first talkgroup in accordance with at least one embodiment. Of course, additional processing steps, receptions, and/or transmissions not disclosed herein could be additionally added before, after, or in-between steps, receptions, and/or transmissions disclosed in FIG. 3, and the presence of such additional steps, receptions, and/or transmissions would not negate the purpose and advantages of the examples set forth in detail throughout the remainder of this disclosure. Furthermore, while a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure.

As shown, the ladder diagram 300 begins at processing step 302 with MR 104 detecting a trigger that causes MR 104 to transmit an affiliation request TG_affiliation_request 304 to controller device 116 via BS 102. The trigger to transmit the TG_affiliation_request 304 may be a powering-on of the MR 104, a rotation of a channel selection dial on a user interface 210 of the MR 104, a selection of a particular talkgroup to affiliate with via a screen and/or input at MR 104, or via some other mechanism. For example, the MR 104 may be picked up by a police officer and the police officer may turn a channel selection dial to a known police channel, thereby triggering the transmission of the TG_affiliation_request 304 message to controller device 116.

In response to receiving the TG_affiliation_request 304 message, the controller device 116 stores an association between the MR 104 and the talkgroup indicated in the TG_affiliation_request 304 message. Future media communications transmitted by the MR 104 will be repeated to all MRs affiliated with the talkgroup indicated in the TG_affiliation_request 304 message, and any media communications from other MRs affiliated with the talkgroup indicated in the TG_affiliation_request 304 message will be repeated to MR 104 and played back at MR 104.

After processing the TG_affiliation_request 304 message, the controller device 116 transmits an acknowledgment and token message ack_and_subTG_token 306 back to MR 104. The ack_and_subTG_token message 306 serves to acknowledge receipt of the TG_affiliation_request 304 message, and also includes a copy of a shared security token that is unique to the talkgroup indicated in the TG_affiliation_request 304 message. The shared security token may be, for example, a pre-configured or randomly generated sequence of symbols separate and different from a talkgroup identifier that uniquely identifies the talkgroup. In other embodiments, the shared security token may be an alphanumeric talkgroup identifier that uniquely identifies the talkgroup, and which is also used in group media communications to identify the talkgroup as the target of the group media communications.

In some embodiments, the controller device 116 may be pre-configured with one or more talkgroups with which MR 104 is associated, and upon registration with an infrastructure RAN (and without the MR 104 transmitting the TG_affiliation_request 304 message), the controller device 116 may provide MR 104 with associated shared security tokens for each of the MR's 104 pre-configured talkgroups. In still further embodiments, the MR 104 may be pre-provisioned (e.g., at the factory or by the network manager, via a USB or Ethernet port, and stored in storage 204, etc.) with the talkgroup identifiers and/or associated shared security tokens for the one or more talkgroups with which it is associated or subscribed, which would eliminate the need for the MR 104 to first communicate with the infrastructure RAN before joining sub-talkgroups on the ad-hoc network. Other possibilities exist as well.

At step 308, the MR 104 processes the ack_and_subTG_token message 306 and extracts the shared security token from the message. The MR 104 may then store the shared security token in a mapping, database, table, or other storage structure in data storage 204, along with an association, link, or tag that identifies the talkgroup with which the shared security token is associated, if necessary.

Message link 310 illustrates a scanning process occurring at MR 104 and MRs 110 via which each MR scans, using its second (short-range) wireless communication interface 208, for other MRs with which to communicate with and/or form an ad-hoc network with. In this example, MR 104 is within direct-mode wireless communication range of MRs 110, and thus is scanning channels for indications of presence of such MRs 110 and for an opportunity to authenticate such MRs. MR 108 is not illustrated in FIG. 3 as it is assumed to be outside of direct-mode wireless communication range of MR 104 and is thus unreachable via MR 104's second (short-range) wireless communication interface 208 (though MR 108 may be reachable via MR's 104 first (infrastructure) wireless communication interface 206).

It is presumed in this example that MR 104 locates, using the scan process illustrated via message link 310 and process step 312, one or more MRs 110 with which to attempt authentication, and records the identity of each MR at step 312. Subsequently, challenge-response authentication (CRA) is used so that MR 104 can ensure that each of the one or more MRs 110 has obtained a same security token for a currently selected talkgroup or for at least one of one or more talkgroups that MR 104 is associated with or subscribed to. Such CRA methods typically use a one-way hash function calculated as a function of the security token. As a result, only MRs having the same security token will be able to reach a matching result when confronted with a particular challenge value. Of course, other methods of authentication could be used as well, such as encrypting and decrypting challenges and responses using the security token and a same encryption and decryption algorithm, requesting and providing a copy of the security token in response, and other known methods of authenticating devices over a wireless link.

As illustrated in FIG. 3, the MR 104 transmits a sub_TG_challenge message 314 to each of the one or more MRs 110 it has located during the scan process, and after processing and generation of an answer to the challenge by MRs 110, each of the one or more MRs 110 provide a response message subTG_response 316. At step 318, MR 104 compares the actual responses provided by each of the one or more MRs 110 and, for each MR response that matches an expected response calculated or otherwise determined at MR 104, the corresponding MR is added to a list of sub-talkgroup MRs over which to transmit and receive full-duplex audio via the second (short-range) wireless communication interface 208. While FIG. 3 illustrates a one-way authentication between MR 104 and the one or more MRs 110, in other embodiments, mutual authentication may take place in which each of the one or more MRs 110 also authenticates MR 104 via a same or similar CRA process.

TABLE I

| TG | SECURITY TOKEN | SUB-TG MRs |
|---|---|---|
| PoliceOne | A90UTY7612 | 0xAH10 |
|  |  | 0xCC99 |
|  |  | 0xDA54 |
| FireTwo | BHR8457ASZ | 0xDA54 |

An example table of sub-talkgroup MR listings maintained at MR 104 is set forth in Table I above. In this example, MR 104 populated a security token data structure as set forth in Table I after affiliating with a PoliceOne talkgroup via its first (infrastructure) wireless communication interface 206 and receiving security token A90UTY7612, after affiliating with a FireTwo talkgroup via its first (infrastructure) wireless communication interface 206 and receiving security token BHR8457ASZ, and after scanning for MRs possessing one or both of security tokens A90UTY7612 and BHR8457ASZ using its second (short-range) wireless communication interface 208 via scanning and challenge/response steps 310-318. For example, MR 104 executed a scan process and located a potential MR 110 having a hardware radio ID (or other type of identifier, such as IP address) of 0xDA54, after which the MR 104 provided the potential MR 110 with challenge requests associated with security tokens A90UTY7612 and BHR8457ASZ in single or separate subTG_challenge messages 314. Assuming in this example that the potential MR 110 responded with challenge responses that matched expected responses for the PoliceOne and/or FireTwo talkgroups in single or separate subTG_response messages(s) 316, MR 104 added the potential MR 110's identifier 0xDA54 as a local sub-talkgroup MR for talkgroups PoliceOne and FireTwo.

Although the MR 104 may not be aware of the entire MR membership of the talkgroup PoliceOne, as such membership information may be stored at controller device 116, the list of sub-TG MRs in Table I represents a sub-set of those MR members of the PoliceOne talkgroup that are within short-range transmission of MR 104. In one embodiment, and as a function of the transmission power of the MR 104 and MRs 110, the PoliceOne sub-TG MRs in Table I may represent those MRs of the PoliceOne talkgroup that are within 1 m, 10 m, 100 m, or 1,000 m of MR 104. As just an example, the talkgroup PoliceOne may contain an additional 5-50 MRs beyond those set forth in the PoliceOne sub-TG of Table I. Similar considerations may apply to the FireTwo talkgroup as well.

The example set forth above with respect to Table I may represent all active sub-talkgroups to which MR 104 is currently coupled via its second (short-range) wireless communication interface, or may merely represent all sub-talkgroups to which MR 104 has authenticated in the past, such that another input such as a channel selection input determines which sub-set of sub-talkgroups the MR 104 is currently coupled via its second (short-range) wireless communication interface. More specifically, in embodiments in which MR 104 is affiliated with two or more talkgroups on the infrastructure network via the first wireless communication interface 206, the MR 104 may authenticate only with those MRs via the second (short-range) wireless communication interface 208 in accordance with a current channel selection input of the radio. For example, if a channel selection input of MR 104 is currently set to PoliceOne or some other channel definition associated with the talkgroup PoliceOne, MR 104 may only attempt to form sub-talkgroups with (e.g., execute CRA and subsequently transmit and/or receive media communications to and/or from) selected MRs determined to be possessing the A90UTY7612 security token. In other embodiments, and perhaps depending on a pre-configuration of the MR 104 or a configuration set via its user interface 210 or set over-the-air by the infrastructure RAN, the MR 104 may attempt to form sub-talkgroups with all or a plurality of (but not all) talkgroups with MRs determined to be possessing any one same security token as MR 104, such as any MRs possessing either the A90UTY7612 security token or the BHR8457ASZ security token in the example above, independent of a current state of a channel selection input at MR 104. In still further embodiments, a priority setting that sets a relative priority of each talkgroup may determine which MRs that MR 104 attempts to form a sub-talkgroup with (e.g., starting at the highest priority), and the MR 104 may first attempt to form a sub-talkgroup using a security token associated with a highest priority talkgroup, and then proceed down the ordered priority list of talkgroups and associated security tokens until one or more MRs are located with which it can form a sub-talkgroup. Other possibilities exist as well.

Returning to FIG. 3, and still during step 318, MR 104 detects a request to transmit communication media to members of the currently selected sub-talkgroup(s) or, in some embodiments, all authenticated MRs of all sub-talkgroups. The request to transmit may include detecting activation of a PTT key 211 in the absence of the infrastructure network (e.g., as shown in FIG. 3, the BS 102 may become unavailable after transmitting the ack_and_subTG_token message 306), activation of a sub-TG PTT key different from a TG PTT key via user interface 210, reception of voice without activation of the PTT key 211, recognition of a corresponding voice command, or some other detected input or condition. In response, the MR 104 transmits the requested stored or captured communication media to the MRs of the sub-talkgroup via its second (short-range) wireless communication interface as subTG_comm_media_xmit 320. Although only one subTG_comm_media_xmit 320 message is illustrated in FIG. 3, additional messages may be transmitted based on a size of the communication media to be transmitted. A header preceding or incorporated within the subTG_comm_media_xmit 320 message may identify the intended destination sub-talkgroup members by talkgroup identifier(s) (e.g., "PoliceOne") or by address(es) (e.g., "0xDA54, 0xAH10, 0xCC99"), among other possibilities. In other embodiments, the subTG_comm_media_xmit 320 message may not identify the target destination or recipient(s), but only those MRs 110 that have authenticated MR 104 receive, decode, and playback the media included in the subTG_comm_media_xmit 320 message.

Subsequently, or at a same time as subTG_comm_media_xmit 320 is transmitted, one of the sub-talkgroup members may wish to talk back to MR 104 and transmits a subTG_comm_media_rcv 322 message that is received at MR 104 via its second (short-range) wireless communication interface. At step 324, the MR 104 uses similar mechanisms as set forth above to determine whether it is an intended target of the subTG_comm_media_rcv 322 and whether to decode and playback media contained in the message. Assuming the subTG_comm_media_rcv message 322 identifies the MR 104 as a target of the message, identifies a talkgroup with which MR 104 is affiliated as a target of the message, and/or MR 104 determines that the subTG_comm_media_rcv 322 message was transmitted by a MR 110 that MR 104 has already successfully authenticated, MR 104 decodes and plays back the received media, perhaps via a speaker and/or display portion of its user interface 210.

Figure 4:
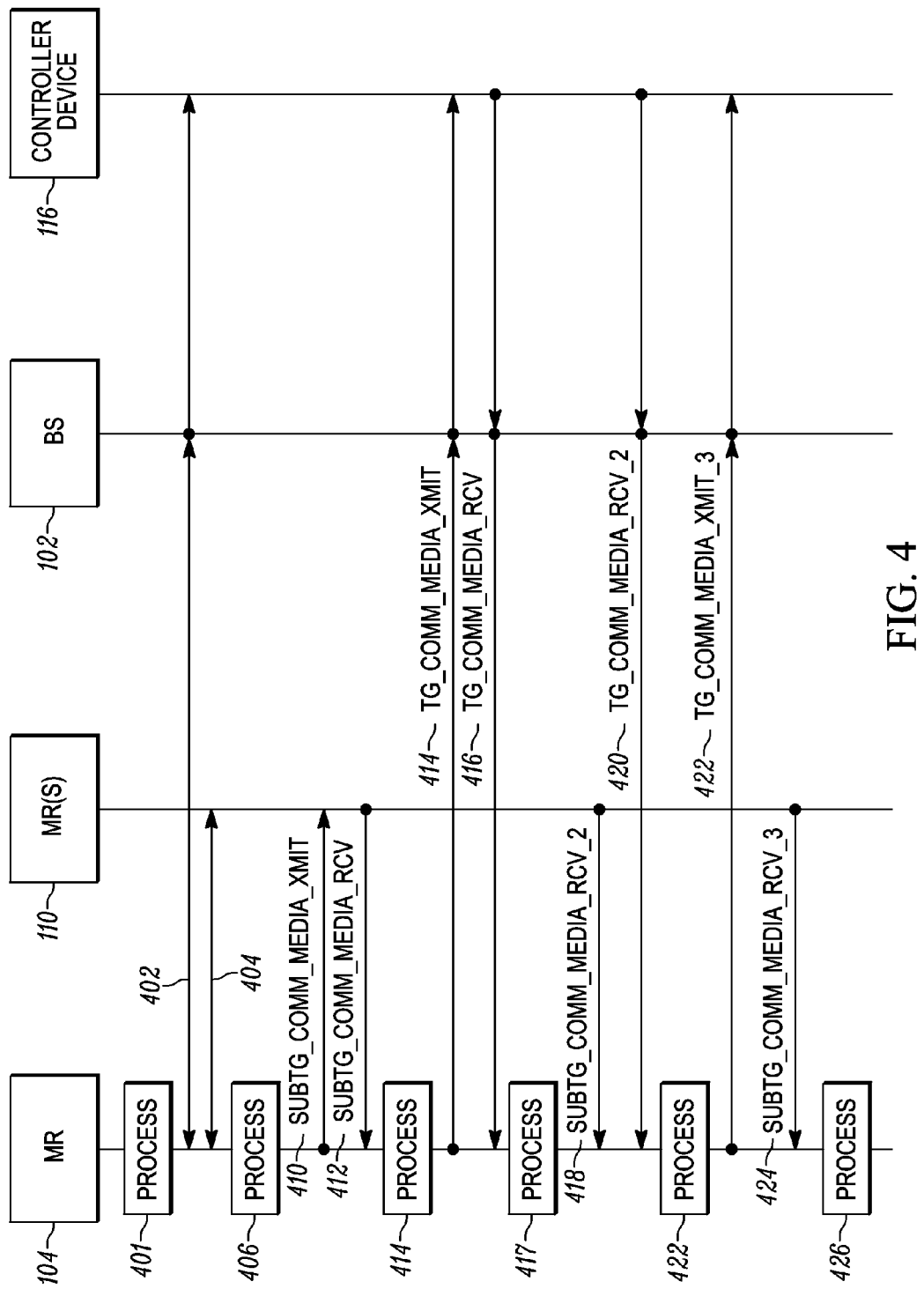
FIG. 4 depicts a ladder diagram illustrating processing steps and message transmissions and receptions for selectively transmitting communication media to a first talkgroup via a first wireless communication interface and to a second talkgroup via a second wireless communication interface as a function of a push-to-talk key activation state, in accordance with at least one embodiment.

3. Processes for Selectively Routing Group Communications amongst Multiple Networks FIG. 4 depicts a ladder diagram 400 illustrating processing steps, message transmissions, and message receptions in a communication system, including MR 104, MRs 110, BS 102, and controller device 116 of FIG. 1, for selectively routing group communications amongst multiple networks in accordance with at least one embodiment. While FIG. 4 is described as a separate and distinct embodiment from that set forth in FIG. 3, in some embodiments, FIG. 4 may illustrate processing steps, message transmissions, and message receptions logically following those set forth in FIG. 3 in situations in which the infrastructure RAN is still accessible. In other words, in situations in which MR 104 of FIG. 3 has access to talkgroups on multiple networks, such as a talkgroup on an infrastructure network via BS 102 and a sub-talkgroup created via authenticated links with one or more MRs 110, the processes described and set forth in FIG. 4 may be used to select which of the talkgroups and networks to transmit communication media to. Of course, the processing steps, message transmissions, and message receptions of FIG. 4 stand on their own as well, and can be applied to communications systems outside those systems, structures, and device states set forth in FIG. 3.

As shown, ladder diagram 400 begins at processing step 401, where MR 104 detects and/or otherwise couples with, forms, or affiliates to a first talkgroup on a first wireless communication network via a first wireless communication interface 206 and unidirectional or bidirectional message transmissions 402, and detects and/or otherwise couples with, forms, or affiliates to a sub-talkgroup of the first talkgroup on a second wireless communication network via a second wireless communication interface 208 and unidirectional or bidirectional message transmissions 404. In the example set forth in FIG. 4, and consistent with the examples set forth in FIG. 3, the first talkgroup is an infrastructure talkgroup established via an infrastructure network (including BS 102 and controller device 116), while the sub-talkgroup is an ad-hoc talkgroup having a subset of MR members of the first talkgroup and that is established via an ad-hoc network. In other embodiments, the roles of talkgroup and sub-talkgroup may be reversed such that the talkgroup is established via the ad-hoc network and the sub-talkgroup established via the infrastructure network, and in still further embodiments, the talkgroup and sub-talkgroup may both be established via separate infrastructure networks (and wireless network interfaces 206, 208) or via separate ad-hoc networks (and ad-hoc network interfaces 206, 208). Still further, entirely separate talkgroups may be established via infrastructure and/or ad-hoc networks that are not related by talkgroup and sub-talkgroup.

At step 406, MR 104 detects a request to transmit group communication media including one or more of voice, audio, image, or video data to members of a first or second talkgroup. The first talkgroup may be determined as a function of a channel selection input and the second talkgroup may be a sub-talkgroup of locally authenticated MRs of the first talkgroup. In other embodiments, the first talkgroup and the second talkgroup may be a separate pair of talkgroups determined as a function of a channel selection input or some other input at MR 104. In a still further embodiment, communication media is transmitted to a selected talkgroup via one of a first and second wireless communication interface as a function of a state of a channel selection input, while communication media transmitted via the other of the first and second wireless communication interface is broadcast or otherwise transmitted to all MRs directly accessible to the MR 104 via that interface or to a union of multiple talkgroup MRs or sub-talkgroup MRs accessible to the MR 104 via that interface.

Detecting the request to transmit may include detecting activation of a PTT key 211, reception of voice without detected activation of the PTT key 211, recognition of a corresponding voice command, the selection of a piece of stored or captured media (image, video, etc.) to transmit via user interface 210, or some other detected input or condition. Other possibilities exist as well.

In response to detecting the request to transmit group communication media, the MR 104 selects one of a first talkgroup via the first wireless communication network and a second talkgroup via the second wireless communication network as a target talkgroup to transmit the communication media to, and does so as a function of a determined state of the PTT key 211. In other words, if the MR 104 determines that the PTT key 211 is activated, the MR 104 will select one of the first talkgroup via the first wireless communication network and the second talkgroup via the second wireless communication network as a target talkgroup to transmit the communication media to, and if the MR 104 determines that the PTT key 211 is de-activated, the MR 104 will select the other of the first talkgroup via the first wireless communication network and the second talkgroup via the second wireless communication network as the target wireless network to transmit the communication media to. The state of the PTT key 211 may be detected in any number of known ways, including accessing a memory location that stores a state of a variable associated with the PTT key 211 input status, reading a state of a switch circuit, reading a state of a presence detection circuit, or any one or more other mechanisms for determining an activated or de-activated state of a binary input.

In the example set forth in FIG. 4, an activated PTT key 211 is configured at MR 104 to be associated with a desire to transmit the communication media to a talkgroup via the first (infrastructure) wireless interface and infrastructure network, while a de-activated PTT key 211 is configured at MR 104 to be associated with a desire to transmit the communication media to a sub-talkgroup via the second (short-range) wireless interface and ad-hoc network. This configuration allows audio, video, and/or images captured at the MR 104 (e.g., audio captured via an always-activated microphone portion of its user interface and digitally encoded or images captured via an always-activated imaging sensor portion of its user interface and digitally encoded, etc.) to be automatically and substantially instantaneously provided to all sub-talkgroup members within a vicinity of the MR 104 and may aid the MR 104's user in accomplishing a location-specific task in the area, while communication media determined important enough by MR 104's user to warrant further distribution to the entire talkgroup with which it is currently associated via the infrastructure network to be transmitted there (and only there, or to both talkgroup and sub-talkgroup) when the user activates the PTT key 211. Of course, similar and/or corresponding benefits may be realized using different configurations depending upon the task at hand and system configuration. For example, communication media could instead be routed to the infrastructure wireless network when the PTT key 211 is de-activated and to the ad-hoc wireless network when the PTT key 211 is activated. Furthermore, communication media could instead be routed to one infrastructure (or ad-hoc) wireless network when the PTT key 211 is de-activated and to another different infrastructure (or ad-hoc) wireless network when the PTT key 211 is activated. Other possibilities and combinations exist as well.

In the example of FIG. 4, the MR 104 determines that the PTT key 211 is deactivated and that the communication media is to be transmitted via its second (short-range) wireless communication interface 208 to sub-talkgroup MRs 110 in the second (as-hoc) wireless network, and then actually transmits a subTG_comm_media_xmit 410 message including the communication media as illustrated in FIG. 4. Although only one subTG_comm_media_xmit 410 message is illustrated in FIG. 4, additional messages may be transmitted based on a size of the communication media to be transmitted. A header preceding or incorporated within the subTG_comm_media_xmit 410 message may identify the intended destination sub-talkgroup members by corresponding talkgroup identifier (e.g., "PoliceOne") or by address (e.g., "0xDA54, 0xAH10, 0xCC99"), among other possibilities. In other embodiments, the subTG_comm_media_xmit 410 message may not identify the target recipient or recipients, but only those MRs 110 that have authenticated MR 104 receive, decode, and playback the media included in the subTG_comm_media_xmit 410 message.

At a same time, or perhaps in response to transmission of the subTG_comm_media_xmit 410 message and corresponding communication media, one or more of the MRs 110 transmits communication media in return to MR 104 in one or more subTG_comm_media_rcv 412 messages. At step 414, MR 104 receives the subTG_comm_media_rcv 412 message and uses similar mechanisms to determine whether it is an intended target of the subTG_comm_media_rcv 412 message and whether to decode and playback media contained in the message. Assuming the subTG_comm_media_rcv message 412 identifies the MR 104 as a target of the message, identifies a talkgroup with which MR 104 is affiliated as a target of the message, and/or MR 104 determines that the subTG_comm_media_rcv 412 message was transmitted by a MR 110 that MR 104 has already successfully authenticated, it decodes and plays back the received media, perhaps via a speaker and/or display portion of its user interface 210.

Also at step 414, MR 104 detects a new request to transmit new group communication media to members of a currently selected talkgroup or sub-talkgroup(s). This time, the MR 104 determines that the PTT key 211 is activated and that the new communication media is to be transmitted via its first (infrastructure) communication interface 206 to MR members of the talkgroup on the first infrastructure network, and then actually transmits a TG_comm_media_xmit 414 message including the new communication media to the infrastructure via BS 102 and controller device 116 for further distribution to talkgroup members, as illustrated in FIG. 4. Although only one TG_comm_media_xmit 414 message is illustrated in FIG. 4, additional messages may be transmitted based on a size of the new communication media to be transmitted. A header preceding or incorporated within the TG_comm_media_xmit 414 message may identify the intended destination talkgroup members by talkgroup identifier or by address, among other possibilities.

At a same time, or perhaps in response to the TG_comm_media_xmit 412 message and corresponding new communication media, one or more of the talkgroup members transmits further communication media to the infrastructure, which in turn transmits the further communication media to MR 104 as TG_comm_media_rcv 414. At step 417, MR 104 receives the TG_comm_media_rcv 414 message and uses similar mechanisms to determine whether it is an intended target of the TG_comm_media_rcv 414 message and whether to decode and playback the further communication media contained in the message. Assuming the TG_comm_media_rcv message 414 identifies the MR 104 as a target of the message or identifies a talkgroup with which MR 104 is affiliated as a target of the message, it decodes and plays back the received further communication media, perhaps via a speaker and/or display portion of its user interface 210.

In an event in which MR 104 receives communication media from both communications interfaces intended for receipt by MR 104 substantially simultaneously or overlapping in time, as illustrated in FIG. 4 by the reception of subTG_comm_media_rcv_2 418 and TG_comm_media_rcv_2 420 messages, the MR 104 may at step 422 either playback one first while temporarily buffering the other for later playback, or may attempt to mix the communication media together and present them simultaneously to the user. For example, in the event that both communication media include voice or audio, the MR 104 may mix the audio, via processor 202 or a separate digital signal processor circuit, and play back the mixed audio to the user via a speaker portion of the user interface 210. In some embodiments, one audio or voice stream may have its gain amplified relative to the other, perhaps based on assigned priorities of talkgroup versus sub-talkgroup or assigned priorities of network interfaces, etc. For example, in the event MR 104 is configured to prioritize audio or voice received from the talkgroup relative to the sub-talkgroup or from the infrastructure network (or first network) relative to the ad-hoc network (or second network), the communication media received from the talkgroup or over the infrastructure network may have its signal gain relatively increased (e.g., amplified) or the communication media received from the sub-talkgroup or over the ad-hoc network may have its signal gain relatively decreased (e.g., attenuated) prior to summing the two audio or voice streams together and playing back the audio via a speaker portion of the user interface 210.

In an event in which the MR 104 transmits communication media such as TG_comm_media_xmit_3 422 via the infrastructure wireless network at a same time as it receives communication media such as subTG_comm_media_rcv_3 424 via the ad-hoc wireless network, at step 426, the MR 104 may buffer the received communication media until the transmission of TG_comm_media_xmit_3 422 is completed, or may play back the communication media included in the subTG_comm_media_rcv_3 424 message while transmitting the TG_comm_media_xmit_3 422 message. In some embodiments, the MR 104 may decrease a gain of (e.g., attenuate) any audio or voice included in the subTG_comm_media_rcv_3 424 message so as to avoid negatively impacting the transmission occurring at MR 104.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A first mobile radio that is a member of a first talkgroup, the first mobile radio comprising:
   an infrastructure wireless communication interface for communicating with an infrastructure radio access network (RAN);
   a short-range wireless communication interface for communicating with an ad-hoc network;
   a processor; and
   data storage containing instructions executable by the processor for causing the first mobile radio to carry out a set of functions, the set of functions comprising:
      receiving, via a provisioning process or via the infrastructure wireless communication interface from the RAN while within wireless communication range of the RAN, a talkgroup-specific security token associated with and shared by all group mobile radios in a first talkgroup to which the first mobile radio is subscribed via the infrastructure wireless communication interface and RAN;
      detecting, via the short-range wireless communication interface, a second mobile radio;
      authenticating, via the short-range wireless communication interface, the second mobile radio using the talkgroup-specific security token and, when successful, adding an identity of the second mobile radio to a sub-talkgroup set of mobile radios of the first talkgroup; and
      selectively transmitting one or more of voice data, image data, and video data to one of the first talkgroup via the infrastructure wireless communication interface and the sub-talkgroup set of mobile radios of the first talkgroup via the short-range wireless communication interface, and not the other, as a function of an input or condition at the first mobile radio.

2. The first mobile radio of claim 1, the set of functions further comprising:
   transmitting, via the short-range wireless communication interface, one or more of voice data, image data, and video data to each of the mobile radios in the set of sub-talkgroup mobile radios of the first talkgroup.

3. The first mobile radio of claim 1, the set of functions further comprising:
   selectively transmitting the one or more of voice data, image data, and video data to the one of the first talkgroup via the infrastructure wireless communication interface and the sub-talkgroup set of mobile radios via the short-range wireless communication interface as a function of a detected user interface input state detected at the first mobile radio.

4. The first mobile radio of claim 1, wherein the functions of detecting and authenticating are executed while the first mobile radio is outside of wireless communication range of the RAN.

5. The first mobile radio of claim 1, wherein the function of authenticating the second mobile radio using the talkgroup-specific security token comprises transmitting a challenge to the second mobile radio via the short-range wireless communication interface, receiving a response from the second mobile radio via the short-range wireless communication interface, and comparing the received response to a calculated response calculated by the first mobile radio using the talkgroup-specific security token and, when the received response and calculated response match, adding the identity of the second mobile radio to the sub-talkgroup set of mobile radios of the first talkgroup.

6. The first mobile radio of claim 1, wherein the talkgroup-specific security token is a randomly generated sequence of symbols associated with the first talkgroup.

7. The first mobile radio of claim 1, wherein the talkgroup-specific security token is a talkgroup identifier of the first talkgroup used to transmit and receive communications to and from the first talkgroup via the infrastructure wireless communication interface and the RAN.

8. The first mobile radio of claim 1, wherein the short-range wireless communication interface is one of a direct-mode land-mobile-radio (LMR), Bluetooth, Zigbee, near-field communication (NFC), and IEEE 802.11 wireless interface.

9. The first mobile radio of claim 8, wherein the infrastructure wireless communication interface is one of an infrastructure-mode land-mobile-radio (LMR) and broadband wireless interface.

10. The first mobile radio of claim 1, the set of functions further comprising, prior to receiving the talkgroup-specific security token, transmitting an affiliation request to the RAN via the infrastructure wireless communication interface requesting affiliation with the first talkgroup, and responsive to transmitting the affiliation request.

11. The first mobile radio of claim 1, the set of functions further comprising:
   detecting, via the short-range wireless communication interface, a plurality of second mobile radios; and
   authenticating each of the plurality of second mobile radios using the talkgroup-specific security token and, in response to successful authentication, adding an identity of each of the plurality of second mobile radios to the sub-talkgroup set of mobile radios of the first talkgroup.

12. The first mobile radio of claim 11, the first mobile radio further comprising a speaker; and
   the set of functions further comprising:
      receiving, via the short-range wireless communication interface, a plurality of audio streams from two or more of the plurality of second mobile radios; and
      mixing the plurality of audio streams together and playing back, via the speaker, the plurality of mixed audio streams.

13. A method carried out by a first mobile radio for joining a sub-talkgroup of a first talkgroup, the method comprising:
   receiving, by the first mobile radio via a provisioning process or via an infrastructure wireless communication interface from an infrastructure radio access network (RAN) while within wireless communication range of the RAN, a talkgroup-specific security token associated with and shared by all group mobile radios in a first talkgroup to which the first mobile radio is subscribed via the infrastructure wireless communication interface and RAN;

detecting, by the first mobile radio via a short-range wireless communication interface, a second mobile radio;

authenticating, by the first mobile radio via the short-range wireless communication interface, the second mobile radio using the talkgroup-specific security token and, when successful, adding an identity of the second mobile radio to a sub-talkgroup set of mobile radios of the first talkgroup; and selectively transmitting, by the first mobile radio, one or more of voice data, image data, and video data to one of the first talkgroup via the infrastructure wireless communication interface and the sub-talkgroup set of mobile radios of the first talkgroup via the short-range wireless communication interface, and not the other, as a function of an input or condition at the first mobile radio.

14. The method of claim 13, the method further comprising:

transmitting, via the short-range wireless communication interface, one or more of voice data, image data, and video data to each of the mobile radios in the set of sub-talkgroup mobile radios of the first talkgroup.

15. The method of claim 13, the method further comprising:

selectively transmitting the one or more of voice data, image data, and video data to the one of the first talkgroup via the infrastructure wireless communication interface and the sub-talkgroup set of mobile radios via the short-range wireless communication interface, as a function of a detected user interface input state detected at the first mobile radio.

16. The method of claim 13, wherein the detecting and the authenticating are executed while the first mobile radio is outside of wireless communication range of the RAN.

17. The method of claim 13, wherein the talkgroup-specific security token is a randomly generated sequence of symbols associated with the first talkgroup.

18. The method of claim 13, wherein the talkgroup-specific security token is a talkgroup identifier of the first talkgroup used to transmit and receive communications to and from the first talkgroup via the infrastructure wireless communication interface and the RAN.

19. The method of claim 13, wherein the short-range wireless communication interface is one of a direct-mode land-mobile-radio (LMR), Bluetooth, Zigbee, near-field communication (NFC), and IEEE 802.11 wireless interface.

20. The method of claim 19, wherein the infrastructure wireless communication interface is one of an infrastructure-mode land-mobile-radio (LMR) and broadband wireless interface.

* * * * *